United States Patent [19]
Gordon et al.

[11] Patent Number: 4,787,964
[45] Date of Patent: Nov. 29, 1988

[54] GAS DIFFUSION ELECTRODES, ELECTROCHEMICAL CELLS AND METHODS EXHIBITING IMPROVED VOLTAGE PERFORMANCE

[75] Inventors: Arnold Z. Gordon, Lyndhurst; Ernest B. Yeager, East Cleveland; Donald A. Tryk, Cleveland Heights; M. Sohrab Hossain, Cleveland, all of Ohio

[73] Assignee: Caterpillar Industrial Inc., Mentor, Ohio

[21] Appl. No.: 48,386

[22] Filed: May 11, 1987

[51] Int. Cl.$^4$ ............................................. C25B 11/00
[52] U.S. Cl. ..................... 204/282; 204/130; 204/294; 429/40; 429/43
[58] Field of Search ............... 204/291, 294, 282, 130; 429/40, 43

[56] References Cited

U.S. PATENT DOCUMENTS

| | | | |
|---|---|---|---|
| 4,407,905 | 10/1983 | Takeuchi et al. | 429/42 |
| 4,514,474 | 4/1985 | Momyer et al. | 429/27 |
| 4,528,249 | 7/1985 | Galbraith | 429/15 |
| 4,614,575 | 9/1986 | Juda et al. | 204/265 |
| 4,615,954 | 10/1986 | Solomon et al. | 429/27 |

FOREIGN PATENT DOCUMENTS 1226507  3/1971  United Kingdom ................ 204/282

OTHER PUBLICATIONS

Sheibly et al., *J. Electrochem. Soc.*, vol. 130, No. 2, pp. 255–259 (Feb. 1983).
Szentirmay et al., *J. Electrochem. Soc.*, vol. 131, No. 7, pp. 1652–1657 (Jul. 1984).
The Electrosynthesis Company, Inc.-RAIPORE® Membrane information sheet (undated).
DeCastro, et al., *J. Electroanal. Chem.*, vol. 138 (1982), 197–200.
DeCastro, et al., *Anal. Chem.* 1987, vol. 59, 134–139.
Fujita, et al., *J. Appl. Electrochem.*, 16, 935–940 (1988).

*Primary Examiner*—John F. Niebling
*Assistant Examiner*—Kathryn Gorgos
*Attorney, Agent, or Firm*—Terry D. Morgan; Robert E. Muir

[57] ABSTRACT

Gas diffusion electrodes, gas generating or consuming electrochemical cells utilizing such electrodes, and a method of preparing such electrodes are disclosed. The electrode comprises an electronically conductive porous body defining respective gas and electrolyte contacting surfaces. The electrode is prepared by forming the porous body, disposing the electrolyte contacting surface in contact with an electrolyte, and contacting the gas contacting surface with a gaseous atmosphere. Current is passed through the porous body at a degree of electrode polarization much higher than normal whereby modification of the electrode material is effected. If desired, a catalyst may be incorporated in the electrode and is subjected to pretreatment as well. The inventive electrodes exhibit superior voltage performance under oxygen polarization conditions.

50 Claims, 5 Drawing Sheets

GAS DIFFUSION ELECTRODES, ELECTROCHEMICAL CELLS AND METHODS EXHIBITING IMPROVED VOLTAGE PERFORMANCE

BACKGROUND OF THE INVENTION

1. Field of the Invention

This invention relates generally to gas diffusion electrodes and, more particularly, this invention relates to gas diffusion electrodes adapted for use in electrochemical cells utilizing a liquid electrolyte and consuming or generating a gas via the electrochemical process occurring within the gas diffusion electrode.

2. Description of Related Art

The use of gas diffusion electrodes in fuel cells and metal-air batteries is well known. Gas diffusion electrodes have also been used in the electrolysis, either oxidation or reduction, of gaseous reactants. It is also possible to generate gases in such electrodes. In general, gas diffusion electrodes take the form of solid porous (gas and liquid permeable) bodies formed at least in part of an electronically conductive, electrochemically active material, and may include a catalyst. Such electrodes generally define an electrolyte contacting surface and a gas contacting surface. Electrochemical oxidation and reduction occurs at the points in the electrode where the gas to be oxidized or reduced contacts both the electrolyte and the active material of the electrode. In the case of gas generation, electrolyte contacts the active material and gas is generated at this interface.

Electrochemical cells utilizing such electrodes generally comprise the gas diffusion electrode, a spaced counter electrode, a liquid electrolyte (which is generally aqueous) which contacts both the counter electrode and the gas diffusion electrode, and a gas which contacts the gas diffusion electrode either (1) for reduction or oxidation of the gas or (2) produced via electrolytic generation. Circuit connections are disposed between the counter and gas diffusion electrodes. Additionally, the counter electrode may also be a gas diffusion electrode. A well known example of such a design is the $H_2/O_2$ fuel cell.

Electrochemical batteries, for example, the metal-air type, commonly utilize either an aqueous alkaline or neutral (e.g., saline) electrolyte, while fuel cells may commonly utilize either acidic electrolytes or alkaline electrolytes. Other types of electrolytes are also used, depending upon the specific gas which is consumed or generated.

The use in electrochemical batteries of an oxygen containing gas such as air which is reduced at the gas diffusion electrode is well known. However, the gas need not be oxygen-containing nor need it be reduced at the gas diffusion electrode. For example, hydrogen gas is oxidized in some fuel cells. The present invention is generally applicable to all such types of gas diffusion electrodes and cells.

The electronically conductive material in a gas diffusion electrode typically may be active carbon or carbon black. The carbon also serves as a support for catalysts such as platinum or transition metal organometallic catalysts (such as porphyrins).

In various applications, it is desirable that the liquid electrolyte flow through the body of the cell over the electrode surfaces. The gaseous reactant also typically flows across the outside surface of the electrode in a separate chamber or manifold.

In operation, it is desirable to maintain the potential of the electrode at a level as close as possible to the open circuit potential (OCP), while maintaining as high a current density as possible. For example, it may be desired to operate a cell at a current density of up to as high as 1.0 A/cm$^2$, but usually somewhat less, while minimizing deviation from the OCP (also termed polarization). For an air cathode, a polarization of up to about 0.20 V at 1.0 A/cm$^2$ would be considered quite good.

Such voltage losses are exclusive of further voltage losses due to the ohmic drop of the electrolyte and any separator which might be used.

For any given electrode, it would be desirable to improve the polarization behavior at useful current densities. For example, in the case of a so-called air cathode, in which air or another oxygen-containing gas is reduced at a gas diffusion cathode, it is desirable to improve the oxygen reduction polarization behavior of such electrodes, especially at low current densities up to about 100 mA/cm$^2$. Improvement is noted by a shift of potential of the electrode to more positive levels at any given current density.

SUMMARY OF THE INVENTION

It is an object of the present invention to overcome one or more of the problems described above.

According to the present invention, a method for pretreating gas diffusion electrodes adapted for use in gas generating or consuming electrochemical cells includes the step of polarizing the gas diffusion electrode much more severely than is usual during normal operation. In the case of an oxygen-consuming cathode, this is done by using a feed gas containing little or no oxygen, e.g., pure hydrogen, nitrogen or argon.

Such pretreatment of the electrode improves its voltage performance significantly.

The invention also comprehends the improved gas diffusion electrode and an electrochemical cell comprising the improved gas diffusion electrode spaced from a counter electrode and in contact with a liquid electrolyte. A gas to be oxidized, reduced or generated is in contact with the surface of the electrode opposite the electrolyte, and circuit connections are disposed between the counter and gas diffusion electrodes.

The invention also comprehends a method of preparing the improved gas diffusion electrode.

The electrode and cell of the invention are capable of operating at high current densities without significant voltage loss.

Other objects and advantages of the invention will be apparent to those skilled in the art from a review of the following detailed description taken in conjunction with the drawings and the appended claims.

DETAILED DESCRIPTION OF THE INVENTION

Figure 1:
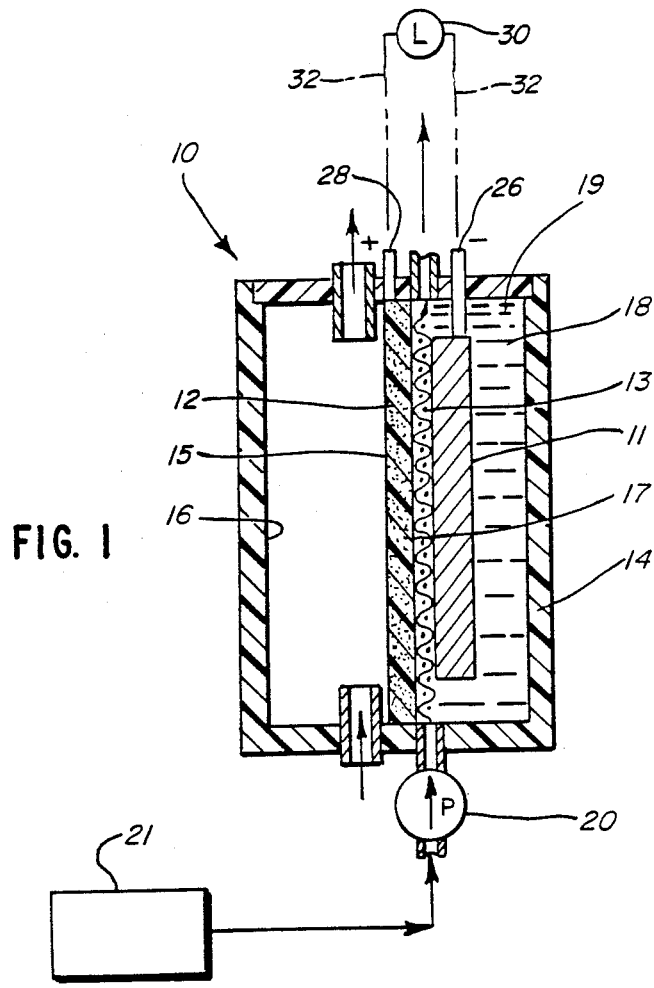
FIG. 1 is a transverse sectional view of one embodiment of an electrochemical cell in which the invention may utilized.

FIG. 1 illustrates a typical embodiment of an electrochemical battery utilizing a gas diffusion electrode. This particular cell is an aqueous alkaline lithium-air cell. It is to be understood that the present invention is not limited to use in electrochemical batteries, nor to cells in which gas is consumed. Rather, the invention finds wide applicability in cells in which gas is either consumed or produced, via either reduction or oxidation, in which any of various electrolytes are used, etc.

The cell of FIG. 1 is described in detail in U.S. Pat. No. 4,528,249 (July 9, 1985) the disclosure of which is incorporated by reference.

In FIG. 1, an electrochemical cell, generally designated 10, includes an anode 11, a gas consuming cathode 12, and a metal screen 13 interposed between the anode 11 and cathode 12 within an outer housing 14. In the embodiment of FIG. 1, the screen 13 is in electrical contact with the cathode 12, and is in mechanical (but not electrical) contact with the anode 11.

In the exemplary embodiment, the anode 11 comprises a lithium anode which may comprise elemental lithium metal, lithium in compound form, or lithium alloy with alloying material such as small amounts of aluminum.

The screen 13 is not in electrical contact with the anode 11, due to the presence of an insulating, porous lithium hydroxide (LiOH) film which is formed on the anode surface by contact thereof with humid air, and is well known in the art. It is to be noted, however, that this particular feature is peculiar to the aqueous lithium-air cell. In other types of metal-air batteries and fuel cells, either an electrically insulating porous sepator layer or a simple electrolyte gap would be used. It should also be noted that the screen 13 is necessary to help restrain the gas diffusion electrode 12 against the gas pressure.

The cathode 12 is in this case an air cathode through which atmospheric air flows. Those skilled in the art, however, will recognize that such a cathode may operate with an oxygen-containing gas.

One surface 15 of the cathode 12 is exposed to ambient atmosphere (or a source of another oxygen-containing gas) in a chamber 16 of the housing 14, and the opposite surface 17 of the cathode 12 is contacted by the liquid electrolyte 18 which is flowed through a second chamber 19 in the housing 14 as by a suitable pump 20. In the illustrated embodiment, the electrolyte is provided from a reservoir 21 for suitable delivery when needed.

In FIG. 1, the anode 11 and cathode 12 each terminate in a respective terminal 26 or 28, and are connected to a load 30 through suitable circuit connections 32.

Typically, the cathode 12 comprises a structure formed of a suitable porous hydrophobic material, such as polytetrafluoroethylene (PTFE), mixed with carbon black, either pure or catalyst-containing. A preferred form of the cathode 12 is described below in connection with FIG. 2.

The screen 13 illustratively may comprise a woven metal wire screen formed of suitable non-corroding metal, such as palladium, rutheium, or of silver plated wire such as nickel wire. If desired, the screen 13 may serve as a current collector if connected to the terminal 28.

In the embodiment of FIG. 1, liquid electrolyte, preferably but not necessarily an aqueous alkaline electrolyte such as aqueous lithium hydroxide, is flowed through the chamber 19 by means of the pump 20. As such, there is a pressure drop across the chamber 19 in the direction of flow.

Further, air is flowed through the chamber 16 by means not shown, and there is a small pressure drop across the chamber 16 in the direction of flow by virtue thereof. However, those skilled in the art will recognize that the pressure drop across the gas chamber 16 is small in comparison to that in the electrolyte chamber 19.

As set forth above, FIG. 1 is intended to be exemplary only, as the invention is applicable to any a variety of types of gas diffusion electrodes and electrochemical cells.

Figure 2:
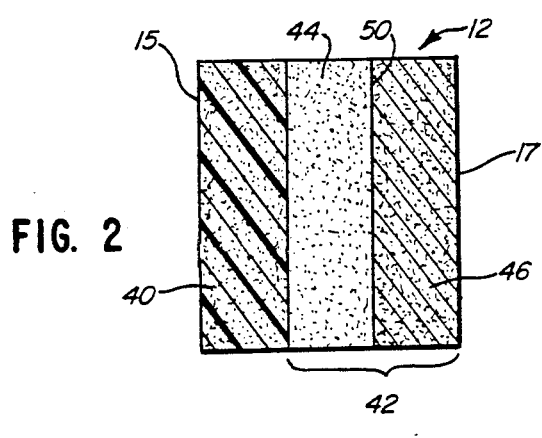
FIG. 2 is a schematic sectional view of a typical gas diffusin electrode with which the invention may be utilized.

FIG. 2 is a schematic depiction of the structure of a preferred embodiment of the cathode 12. As shown in FIG. 2, the cathode 12 is formed essentially of a two or three component laminate defining the gas contacting surface 15 and the opposed electrolyte contacting surface 17. An electronically conductive porous gas carrier layer 40 defines the gas contacting surface 15 and typically is a mixture of a hydrophobic material such as porous PTFE (e.g. Teflon brand PTFE) with a carbon black such as Shawinigan black (Gulf Oil Chemicals). A so-called "active layer" 42 comprises a layer 44 which comprises a mixture of carbon black, or catalyst supported on carbon black, and PTFE. An optional layer 46 of catalyst is disposed on the layer 44 at an interface 50. As shown in the schematic of FIG. 2, layers 44 and 46 appear to be discrete layers, but in practice may define a single layer or two layers, since the catalyst is generally adsorbed onto the surface of the material of layer 44. In some cases, the materials of the three layers 40, 44 and 46 may be intermixed in a single layer.

The entire structure of the electrode 12 of FIG. 2 is porous, generally exhibiting a porosity of 30-60%.

A typical catalyst forming the layer 44 is heat-treated cobalt tetramethoxyphenyl porphyrin (CoTMPP) on a carbon black such as Vulcan XC-72 (Cabot Corp., Billerica, MA). The heat treatment is typically done at 400°–1000° C. in inert gas. The structure of CoTMPP is shown below:

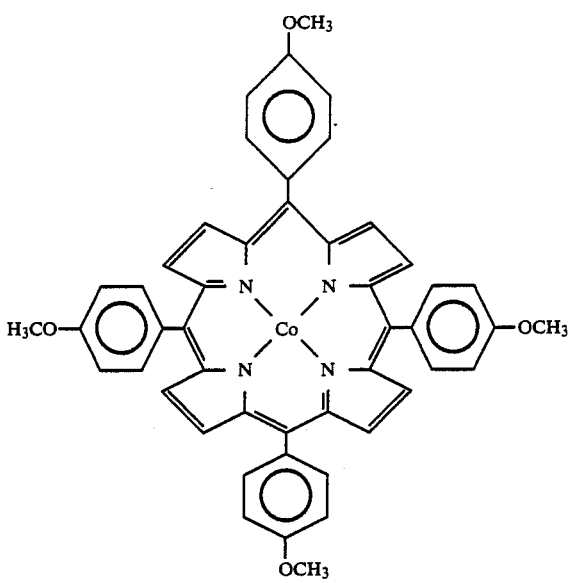

This material is a currently preferred catalytic material. Other catalysts include platinum, $MnO_2$ and transition metal macrocycles other than CoTMPP.

The function of the layer 40 is to allow ready transmission of gas to the active layer 44. Its hydrophobicity also acts to repel liquid electrolyte which exists in the active layer 44 in order to avoid leakage of the liquid electrolyte into the gas side of the cell. It also provides electronic conductivity.

The requisite consumption or generation of gas takes place in the active layer 44 where gas and liquid meet in the presence of the active material and optional catalyst, as is well known in the art.

Figure 3:
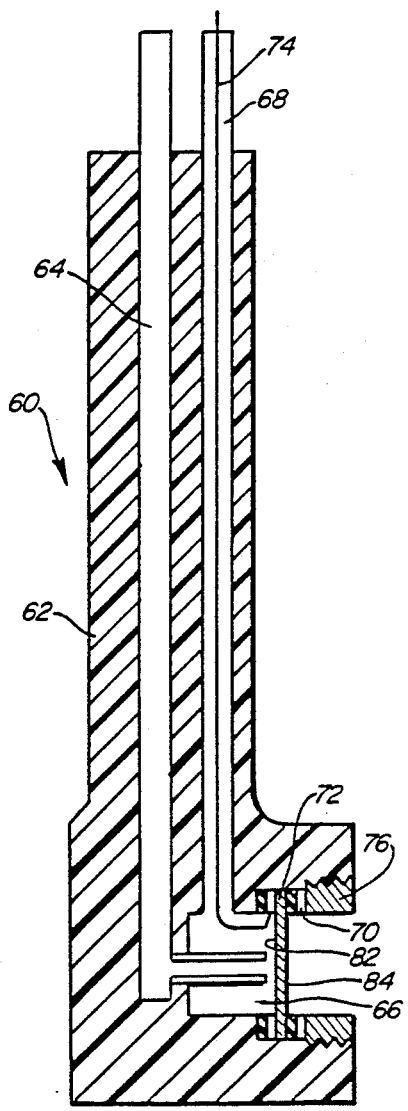
FIG. 3 is a sectional view of an electrode holder useful in testing gas diffusion electrodes.

FIG. 3 illustrates an electrode holder useful in measuring characteristics of gas consuming or generating electrodes. The electrode holder, generally designated 60, comprises a solid body 62 of a nonconductive material defining a gas inlet passage 64 communicating with a cell gas chamber 66 which in turn communicates with a gas outlet passage 68. (A typical material of construction for the body 62 is 3M's Kel-F brand fluorocarbon polymer.) An annular electrode seat 70 is defined in the body 62 in order to position an electrode assembly (not shown in FIG. 3) which includes a gas diffusion electrode, generally designated 72, adjacent the cell chamber 66. A conductive (e.g. platinum) wire 74 contacts the seat 70 and extends therefrom through the outlet passage 68. A threaded plug 76 of the same material as the body 62 retains an electrode assembly 80 (shown in FIG. 4) in place in the body 62.

Figure 4:
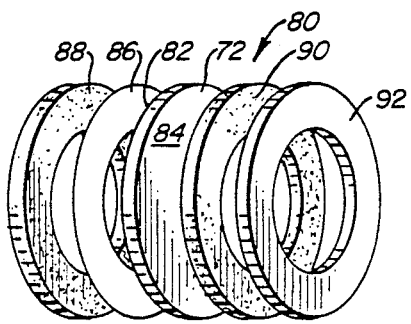
FIG. 4 is a schematic exploded perspective view of an electrode assembly adapted for use with the electrode holder of FIG. 3.

FIG. 4 illustrates the electrode assembly, generally designated 80, which includes the gas diffusion electrode 72 of FIG. 3. The electrode 72 is shown in schematic form in FIG. 4 and formed as a cylindrical disc defining gas and electrolyte contacting surfaces 82 and 84 respectively. These surfaces are analogous to surfaces 15 and 17 of FIG. 1. An annular conductive metal (e.g. platinum) ring 86 is disposed on the gas surface 82 between the gas surface 82 and an annular rubber gasket 88. A similar rubber gasket 90 is disposed on the electrolyte side of the electrode 72 between the electrolyte contacting surface 84 and an annular ring 92 of the same material as the body 62.

When the assembly 80 is in place in the seat 70 of the electrode holder 60, the ring 86 in electrical contact with the wire 74 and acts as a current collector.

Figure 5:
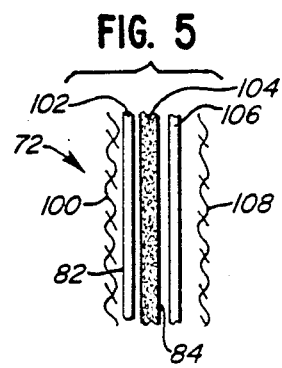
FIG. 5 is a schematic transverse sectional view of a gas diffusion electrode useful in the embodiments of FIGS. 3 and 4.

The electrode 72 as shown in FIGS. 3 and 4 is schematic and these figures do not illustrate certain components such as the hydrophobic backing layer and associated screen. FIG. 5 illustrates an exploded sectional schematic view of one embodiment of the electrode 72. A silver plated nickel screen 100 is adjacent and in contact with an electronically conductive hydrophobic backing layer 102, typically of Teflon brand PTFE plus carbon black, which defines the surface 82. An active layer 104 which may include a catalyst on carbon black is adjacent the layer 102 and defines the surface 84. An optional gas barrier memberane 106 is applied to the surface 84 and is in contact with a steel reinforcement screen 108.

When constructed, the screen 100 is not in physical or electrical contact with the ring 86 and thus merely acts as a physical restraint. The gas inlet passage 64 and gas outlet passage 68 are connected with gas flow regulating means (not shown) which regulate the flow of gas through the passage 64 and 68 and the cell chamber 66, and thus the gas pressure in the chamber 66.

Those skilled in the art will recognize that the screens 100 and 108 may be imbedded in the layers 102 or 106, respectively, and that the layers 102 and 104 may form a single homogeneous layer if desired.

When the electrode 72 is in place in the assembly 80 in the electrode holder 60, a central circular segment of each of the electrode surfaces 82 and 84 is exposed to gas and electrolyte sources, respectively. The electrode holder body 62 is positioned in a test cell such that the electrode surface 84 is exposed to a flowing or nonflowing (e.g. stirred) electrolyte. The remainder of the cell and associated temperature control means, etc., are omitted for clarity.

For operation at elevated gas/electrolyte differential pressures, the steel screen 108 acts as a reinforcement to prevent physical rupture of the electrode 72. Flowthrough of gas from the cell chamber 66 through the electrode 72 into the electrolyte side of the cell is prevented by the optional membrane 106 or by another form of ionomeric gas barrier material.

The membrane 106 is a preformed membrane which is applied directly to the active layer surface 84 of the electrode preferably without adhesives or other intervening layers. The membrane is preferably of an ionomeric ion exchange resin which is substantially impermeable to the gross passage of gas. The material is preferably an anion exchange resin which is ionically conductive to the electrolyte. Thus, the electrode 72 may be effectively wetted by passage of liquid electrolyte through the membrane 106, while the membrane 106 is virtually impermeable to gas flow.

The membrane 106 is ionomeric, and is quite hydrophilic and readily contains and transfers ionic charge, thus allowing for minimal excess voltage loss relative to conventional gas diffusion electrodes.

Although relative performance varies, any of a wide variety of anionic ion exchange membranes are suitable. Several are available from the RAI Research Corporation, and are distributed by The Electrosynthesis Company, Inc. of East Amherst, N.Y., under the trademark RAIPORE®. For example, RAIPORE R-1035 anionic membrane is an anionic exchange membrane which is a quaternized vinylbenzylamine grafted polytetrafluoralethylene film available in 1 mil thickness.

RAIPORE R-4035 anionic membrane is an anionic exchange memberane which is a quaternized vinylbenzylamine graft on a 2 mil preformed fluorinated polymer film. RAIPORE R-5035 (L or H) anionic membrane is a quaternized vinylbenzylamine grafted polyethylene exchange membrane available in 8 mil thickness. This material is available in low or high electrolytic resistances.

A currently preferred anionic exchange membrane is available from Ionics, Inc. of Watertown, Mass. under the trademark IONAC, e.g. IONAC MA3475. This material comprises a quaternized (tetraalkyl) ammonium polymer.

In general, preferred membrane materials are characterized as being hydrophilic anionic exchange resins and these are understood by the art to contain cationic functional groups.

In practice, the membrane may be applied to the electrode active layer surface by mere application of pressure.

Gas diffusion electrodes incorporating such an ionomeric gas impermeable membrane are described in detail in copending, commonly assigned application Ser. No. 20,777 filed Mar. 2 1987 in the names of Arnold Z. Gordon, et al., the disclosure of which is incorporated herein by reference.

Other forms of ionomeric, gas impermeable materials definig a barrier against gas flow through the electrode include coprecipitated hydrogels, combinations of ionomeric polymers with ionomeric membranes, ionomers crosslinked by gamma radiation, and active layers of gas diffusion electrodes loaded with hydrogels. Such barrier materials are described in detail in Gordon, et al. Ser. No. 20,746; Yeager, et al. Ser. No. 20,748; Tryk, et al. Ser. No. 20,747; and Hossain, et al. Ser. No. 20,749 each filed Mar. 2, 1987, copending and commonly assigned herewith. The disclosure of each said application is expressly incorporated by reference herein.

According to the invention, a gas diffusion electrode comprising a porous body of an electronically conductive material is prepared prior to use as follows. The electrode is disposed in contact with a liquid electrolyte on one side thereof, and in contact with a gaseous atmosphere on the other side. In the case of a gas-consuming electrode, the particular gas in question is kept to a relatively low level (i.e. partial pressure) so that the electrode polarizes significantly. In the specific case of an oxygen-consuming cathode, oxygen gas is kept to a low level for instance by using hydrogen, nitrogen or argon gas. The current is passed through the electrode body. Such treatment significantly improves the voltage performance of such electrodes as measured with subsequent testing.

For example, an air cathode comprising a porous body of active carbon having opposed gas and liquid-contacting surfaces may be disposed with its liquid-contacting surface in contact with an aqueous electrolyte, with hydrogen gas being allowed to pass over the gas contacting side of the electrode for a period of about 1 minute to about 2 hours, with a current density of about 40 to 100 mA/cm$^2$. Current may be provided by any convenient power source. During such cathodic modification of the cathode the potential of the electrode may reach extremely negative levels (e.g. about $-1.3$ to $-1.4$ volt) versus a mercury/mercury oxide (Hg/HgO) reference electrode.

It is essential that the atmosphere be very lean in oxygen or be oxygen free such that reduction is carried out under oxygen starvation conditions, i.e. under conditions wherein the oxygen reduction current is significantly smaller than the applied current. Under such oxygen starvation conditions the polarization increases (i.e. the potential of the electrode becomes increasingly negative) until the electrode potential is sufficiently negative to electrolytically generate hydrogen in order to satisfy the applied current. At this high polarization, certain changes may occur in the electrode material (support and catalyst).

The principal reaction involved is the reduction of water in the electrolyte, with reduction of the active material groups and catalyst being secondary.

This preparation method is useful with electrodes having catalysts as well as with those which do not contain catalysts.

The mechanism resulting in improved electrode performance is not currently known, but it is theorized that reduction prior to use may result in improved oxygen wicking into the active layer of the electrode, or possibly improved electrolyte distribution therein.

The inventive method may be utilized with electrodes bearing a gas barrier layer, or such a layer may be incorporated into the electrode after reductive pretreatment, if desired.

The conditions under which the electrodes may be pretreated according to the invention vary widely. Increases in temperature tend to speed the process, as do increases in current density and duration of treatment. Satisfactory electrodes have been prepared utilizing current densities from 40 to 100 mA/cm$^2$ and, at current densities of 100 mA/cm$^2$, treatment durations of 1 minute to 2 hours have been successful. It is preferred to carry out the reduction reaction at about 80° C., but temperatures lower than 80° C., e.g. ambient temperature, are suitable.

The combination of conditions necessary to effect a predetermined degree of electrode modification will be readily empirically determinable by one skilled in the art guided by the present disclosure including the following specific examples. It has been found that catalysts which are not heat treated are preferred as compared to heat treated catalysts. With the latter catalysts, if the electrode is pretreated to too great an extent, the advantageous improvements in voltage performance will be reversed, as demonstrated below in Example 3, FIG. 8, Runs 4–6.

Optimization with respect to electrode preparation conditions will depend at least in part on the current density at which it is desired to use the electrode after preparation. Generalizing, the use of a high current density is equivalent to the use of lengthy preparation times, although pretreatment at excessively high current densities may be detrimental to the electrode performance and/or longterm stability.

Voltage performance improvements according to the invention can be directly measured in terms of increased power production by batteries or reduced power requirements in the case of electrodes used in electorlysis cells.

Summarizing, cathodic pretreatment of active gas diffusion electrodes prior to use improves subsequent electrode performance during oxygen reduction especially at relatively low current densities (e.g. less than 100 mA/cm$^2$) using such gases as air and pure oxygen.

Further, electrodes utilizing an ionomeric gas barrier membrane disposed over the electrolyte contacting surface and pretreated in a hydrogen atmosphere show relatively low polarization (about −60 mV vs. Hg/HgO at 100 mA/cm$^2$) and can withstand a gas side over-pressure of 10 psi.

The beneficial effects of cathodic pretreatment are not specific to macrocycle catalysts such as CoTMPP but can extend to, for example, active carbon such as carbon black without added catalysts. The reason for improved electrode performance at low current densities may be associated with improved electrolyte distribution in the electrode, which could result during hydrogen generation at the very negative potential. At higher current densities, somewhat poorer activity may result from flooding of the electrode structure by the electrolyte.

EXAMPLES

The following specific examples are intended to illustrate the practice of the invention, but are not to be considered limiting in any way.

The following generalized experimental procedure was followed in the examples.

In Examples 1–3, cobalt tetramethoxyphenyl porphyrin (CoTMPP) was adsorbed on Vulcan XC-72 carbon (Cabot) by agitating a suspension of latter in a solution of 10$^{-4}$M CoTMPP in acetone for at least 24 hours. The concentration of the adsorbed macrocycle was calculated spectrophotometrically. In Example 1, the solid catalyst/carbon was air-dried and then heat-treated to 450° C. in a horizontal tube furnace under continuous flow of purified argon.

Porous gas-fed electrodes were fabricated as follows: dilute (∼2 mg/mL) Teflon T30 B aqueous suspension (duPont) was slowly added to an aqueous suspension of the catalyst/carbon while the latter was ultrasonically agitated. The mixed suspension was then filtered out with a 1μm pore size polycarbonate filter membrane. The paste was worked with a spatula until slightly rubbery. The paste was shaped into a 1.75 cm diameter disk in a stainless steel die using hand pressure. This disk was then applied to another disk, ∼0.5 mm thick of Teflon-carbon black hydrophobic porous sheet material (Eltech Systems Corp.) which contained a silver-plated Ni mesh. This dual layer disk was pressed at 380 kg cm$^{-2}$ at room temperature and then heat-treated at 290° C. for 2 hours in flowing helium.

The gas-fed electrode was placed in a Teflon-Kel-F electrode holder as shown in FIG. 3. The gas (H$_2$, O$_2$ or air) pressure was applied to the back-side (hydrophobic layer) of the electrode and was monitored at the outlet. A needle valve at the outlet was used to regulate the gas pressure.

The H$_2$ reduction pretreatment and the O$_2$ reduction measurements of the gas-fed electrodes were done galvanostatically in a concentrated alkaline electrolyte (0.5M LiOH in 2:1 v/v 50% NaOH and 45% KOH) at 80°–83° C. with a research potentiostat (Stonehart Associates, Model BC1200). This potentiostat is equipped with positive feedback IR drop compensation and correction circuits. The IR drop correction is made by repetitively interrupting the current for 0.1 ms after the current is on for 1.1 ms. Nickel foil was used as the counter electrode and a Hg/HgO, OH$^-$ reference electrode was used. During pretreatment, potential reached about −1.3 to −1.5 V vs. the Hg/HgO counter electrode. The polarization curves were recorded under steady-state conditions.

EXAMPLE 1

In this case, a gas diffusion electrode containing 4.4 weight percent CoTMPP on XC-72 carbon was prepared. The catalyst was heat treated at 450° C. Oxygen polarization curves were prepared using pure oxygen.

Figure 6:
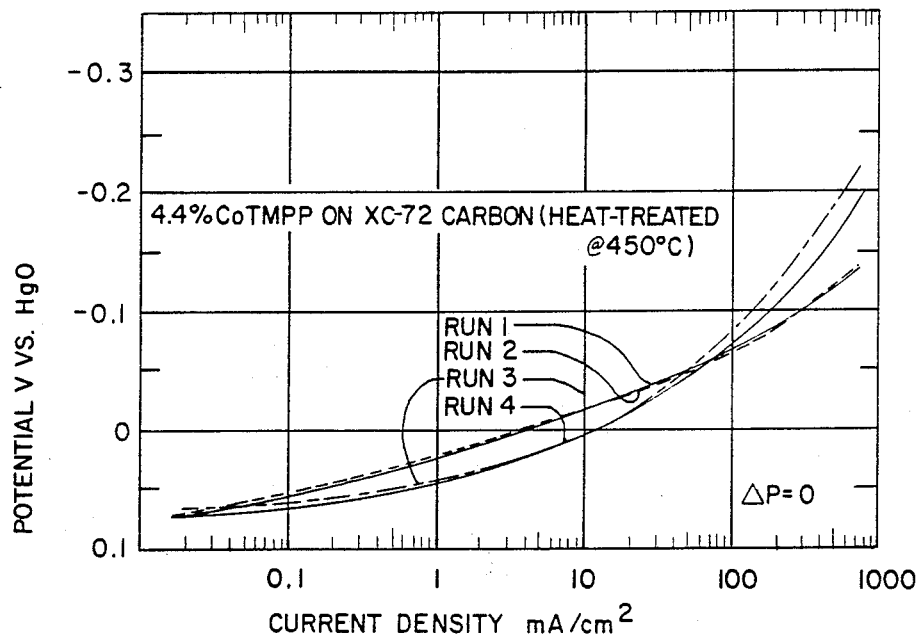
FIG. 6 is a series of polarization curves exhibited by an electrode made according to the invention.

In FIG. 6, runs 1 and 2 represent the performance of a fully broken in, nonpretreated electrode. Run 3 represents an electrode pretreated at a current density of 100 mA/cm$^2$ for 30 minutes under a hydrogen atmosphere at atmospheric pressure. Run 4 represents a similar electrode pretreated for 1 hour at the same current density.

It is noted that the cathodic pretreatment gave rise to an improvement in the oxygen reduction polarization behavior at low current densities (i.e. below about 70 mA/cm$^2$). At higher current densities, the relative performance of the pretreated electrodes was somewhat poorer. This is likely due to the lack of optimization of the procedure for the heat treated catalyst and it should not be interpreted as a general result.

EXAMPLE 2

Figure 7:
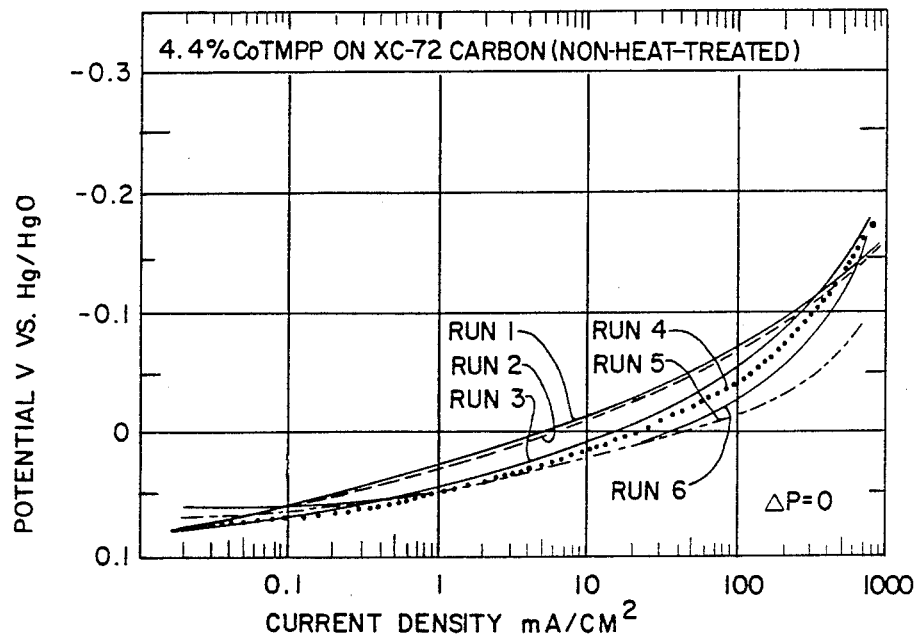
FIG. 7 is a series of polarization curves exhibited by another embodiment of an electrode made according to the invention.

FIG. 7 represents a series of runs utilizing oxygen (O$_2$) and a catalyst identical to that of Example 1 dispersed on XC-72 carbon but not heat treated. In this case, runs 1 and 2 represent fully broken in but not pretreated electrodes. Runs 3–6 resulted from electrodes pretreated at 1 minute, 30 minutes, 1 hour and 2 hours respectively at 100 mA/cm$^2$. In these cases, significantly better performance was observed over the entire range of current densities tested.

EXAMPLE 3

Figure 8:
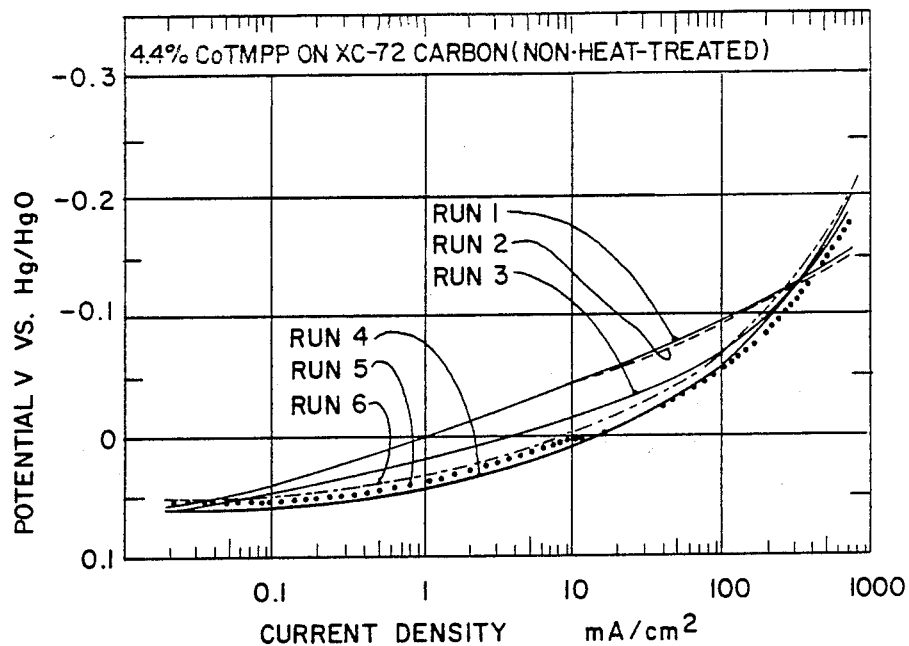
FIG. 8 is a series of polarization curves exhibiting by yet another embodiment of an electrode made according to the invention.

The tests shown in FIG. 8 were carried out with O$_2$ exactly the same as were those of Example 2 in FIG. 7 under identical conditions except that a gas impermeable ionic membrane material (Ionics, Inc. IONAC MA 3475) was disposed over the electrode active layer. Runs 1 and 2 represent fully broken in but not pretreated electrodes, while runs 3–6 represent pretreatment at 1 minute, 30 minutes, 1 hour and 2 hours respectively at 100 mA/cm$^2$. Oxygen polarization tests were carried out at an elevated gas/liquid pressure difference of zero psi.

EXAMPLE 4

Figure 9:
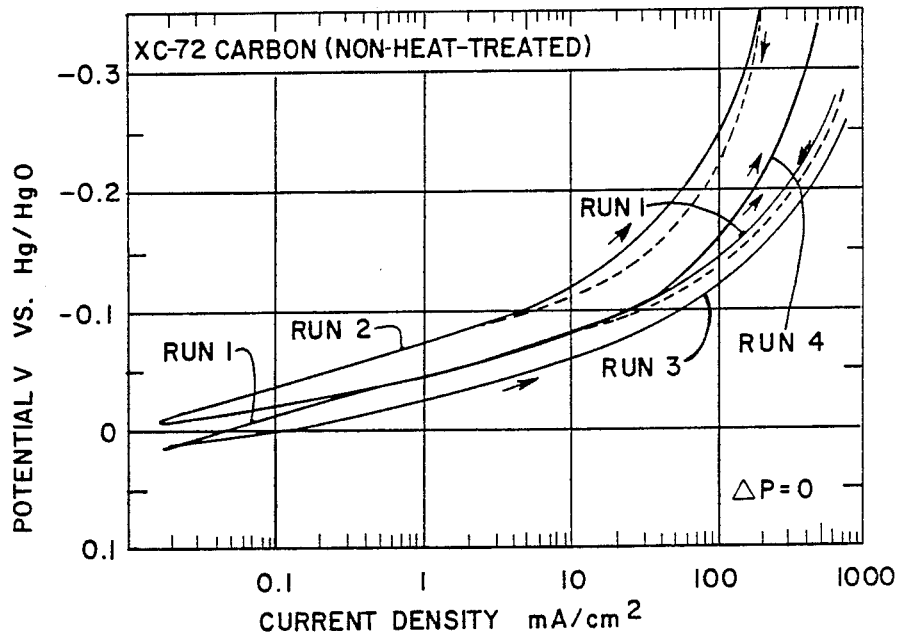
FIG. 9 is a series of polarization curves for still another embodiment of the invention; and, FIG. 10 is a series of polarization curves exhibited by a further embodiment of the invention.

FIG. 9 represents a series of tests carried out with a gas diffusion cathode comprised of XC-72 active carbon but free of catalysts and nonheat treated.

The test of run 1 used pure oxygen and that of run 2 used air, in each case with a fully broken in electrode which was not pretreated. Run 3 utilized pure oxygen after pretreating at 100 mA/cm$^2$ under a hydrogen atmosphere (one atmosphere) for 15 minutes. The electrode of run 4 was prepared identically but oxygen polarization testing was carried out using air. In each of runs 3 and 4 the relative potential of the electrode reached about −1.5 volts during pretreatment as compared to a Hg/Hgo reference electrode. It is clear from the examination of FIG. 9 that run 3 is marketly superior to counterpart run 1, and that run 4 is clearly superior to counterpart run 2 over the entire range of tested current densities.

EXAMPLE 5

Figure 10:
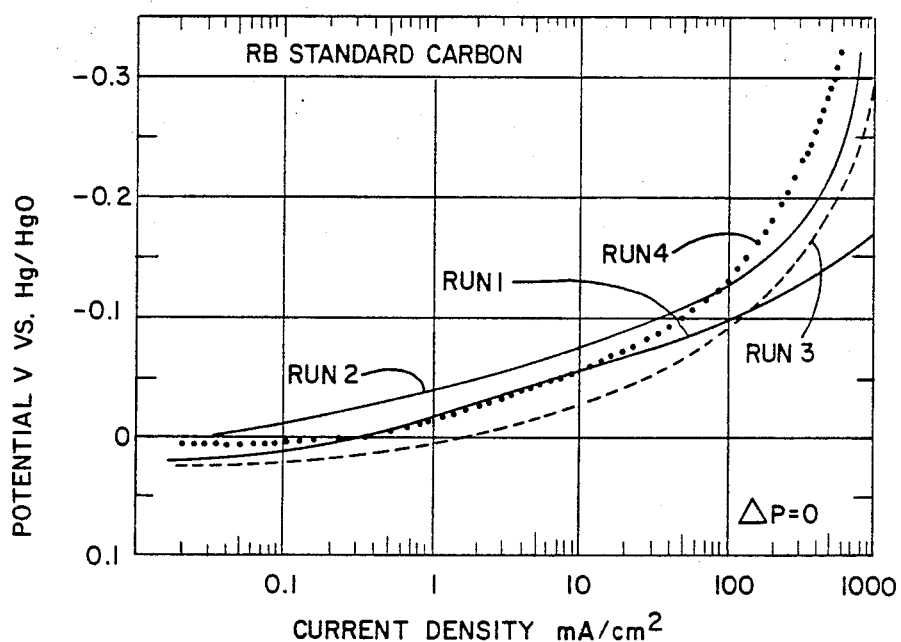

FIG. 10 shows the results of oxygen polarization tests of a gas diffusion cathode made from RB standard active carbon (Calgon Corporation), without a catalyst or heat treatment. Runs 1 and 2 are fully broken in catalysts tested with pure oxygen and air, respectively, but without pretreatment. The electrodes of runs 3 and 4 were each prepared under a hydrogen atmosphere (1 atm) for 30 minutes at a current density of 40 mA/cm$^2$. In each case, the potential reached about $-1.3$ volts vs Hg/HgO during pretreatment. Run 3 was tested with pure oxygen, and run 4 with air.

The superiority in terms of voltage performance of run 3 versus run 1, and that of run 4 versus run 2 at current densities of less than about 100 mA/cm$^2$ is clearly evident.

A review of the foregoing examples clearly shows that the beneficial effects of cathodic pretreatment according to the invention are not specific to the use of a specific catalyst, but can extend to gas diffusion electrodes formed of active carbon without added catalysts.

The foregoing detailed description is given for clearness of understanding only, and no unnecessary limitations are to be inferred therefrom, as modifications within the scope of the invention will be obvious to those skilled in the art.

We claim:

1. A gas diffusion cathode adapted for use in an oxygen consuming electrochemical cell, said cathode being prepared by the method comprising the steps of:
   (a) forming a porous body defining a gas contacting surface and an opposed liquid contacting surface of electronically conductive active carbon having a transition metal macrocycle catalyst adsorbed thereon;
   (b) disposing said porous body in contact with an aqueous alkaline electrolyte at said liquid contacting surface and in contact with a hydrogen or an inert gaseous atmosphere at said gas contacting surface; and,
   (c) passing current through said porous body while in contact with said electrolyte and said gaseous atmosphere at an intensity and for a duration sufficient to effect a desired predetermined degree of improvement in the oxygen reduction polarization behavior of said cathode.

2. The cathode of claim 1 wherein said atmosphere is an inert atmosphere.

3. The cathode of claim 1 wherein said atmosphere comprises hydrogen gas.

4. The cathode of claim 1 wherein said atmosphere comprises nitrogen or argon gas.

5. The cathode of claim 1 wherein said catalyst is cobalt tetramethoxyphenyl porphyrin.

6. The cathode of claim 1 wherein said porous body includes an ionomeric ionically conductive material defining a barrier against gas flow through said porous body.

7. The cathode of claim 6 wherein said ionomeric material defines a membrane disposed over said liquid contacting surface.

8. The cathode of claim 6 wherein said ionomeric material is incorporated in said porous body.

9. The cathode of claim 6 wherein said ionomeric material comprises a quaternized ammonium polymer.

10. The cathode of claim 9 wherein said ionomeric material comprises a tetraalkylammonium polymer.

11. The cathode of claim 1 wherein said step (c) is carried out at an elevated temperature.

12. The cathode of claim 11 wherein said step (c) is carried out at at least about 80° C.

13. The cathode of claim 1 wherein a current density of at least about 40 mA/cm$^2$ is applied during said step (c).

14. The cathode of claim 13 wherein said current density is at least about 100 mA/cm$^2$.

15. The cathode of claim 14 wherein said step (c) is carried out at at least about 80° C.

16. The cathode of claim 14 wherein said current is applied for about 1 minute to 2 hours.

17. A method of preparing a gas diffusion cathode adapted for use in an oxygen consuming electrochemical cell, said method comprising the steps of:
   (a) forming a porous body defining a gas contacting surface and an opposed liquid contacting surface of electronically conductive active carbon having a transition metal macrocycle catalyst adsorbed thereon;
   (b) disposing said porous body in contact with an aqueous alkaline electrolyte at said liquid contacting surface and in contact with a hydrogen or an inert gaseous atmosphere at said gas contacting surface; and,
   (c) passing current through said porous body while in contact with said electrolyte and said gaseous atmosphere at an intensity and for a duration sufficient to effect a desired predetermined degree of improvement in the oxygen reduction polarization behavior of said cathode.

18. The method of claim 17 wherein said atmosphere is an inert atmosphere.

19. The method of claim 17 wherein said atmosphere comprises hydrogen gas.

20. The method of claim 18 wherein said atmosphere comprises nitrogen or argon gas.

21. The method of claim 17 wherein said catalyst is cobalt tetramethoxyphenyl porphyrin.

22. The method of claim 17 wherein said porous body includes an ionomeric ionically conductive material defining a barrier against gas flow through said porous body.

23. The method of claim 22 wherein said ionomeric material defines a membrane disposed over said liquid contacting surface.

24. The method of claim 22 wherein said ionomeric material is incorporated in said porous body.

25. The method of claim 22 wherein said ionomeric material comprises a quaternized ammonium polymer.

26. The method of claim 25 wherein said ionomeric material comprises a tetraalkylammonium polymer.

27. The method of claim 17 wherein said step (c) is carried out at an elevated temperature.

28. The method of claim 27 wherein said step (c) is carried out at at least about 80° C.

29. The method of claim 17 wherein a current density of at least about 40 mA/cm$^2$ is applied during said step (c).

30. The method of claim 29 wherein said current density is at least about 100 mA/cm$^2$.

31. The method of claim 30 wherein said step (c) is carried out at at least about 80° C.

32. The method of claim 30 wherein said current is applied for about 1 minute to 2 hours.

33. An electrochemical cell, comprising:
   (a) a gas diffusion cathode prepared by the method comprising the steps of:
      (1) forming a porous body defining a gas contacting surface and an opposed liquid contacting surface of electronically conductive active carbon having a transition metal macrocycle catalyst adsorbed thereon;

(2) disposing said porous body in contact with an aqueous alkaline electrolyte at said liquid contacting surface and in contact with a hydrogen or an inert gaseous atmosphere at said gas conacting surface; and, (3) passing current through said porous body while in contact with said electrolyte and said gaseous atmosphere at an intensity and for a duration sufficient to effect a desired predetermined degree of improvement in the oxygen reduction polarization behavior of said cathode;

(b) an anode spaced from said cathode;

(c) an aqueous alkaline electrolyte in contact with said anode and with said liquid contacting surface of said cathode;

(d) an oxygen-containing gas to be consumed via reduction in contact with said gas contacting surface of said cathode during operation of said cell; and, (e) circuit connections between said cathode and said anode.

34. The cell of claim 33 wherein said gas of (d) is air.

35. The cell of claim 33 wherein at least one of said electrolyte of (c) and said of (d) flow through said cell during operation thereof.

36. The cell of claim 33 wherein said atmosphere is an inert atmosphere.

37. The cell of claim 33 wherein said atmosphere comprises hydrogen gas.

38. The cell of claim 36 wherein said atmosphere comprises nitrogen or argon gas.

39. The cell of claim 33 wherein said catalyst is cobalt tetramethoxypheyl porphyrin.

40. The cell of claim 33 wherein said porous body includes an ionomeric ionically conductive material defining a barrier against gas flow through said porous body.

41. The cell of claim 40 wherein said ionomeric material defines a membrane disposed over said liquid contacting surface.

42. The cell of claim 40 wherein said ionomeric material is incorporated in said porous body.

43. The cell of claim 40 wherein said ionomeric material comprises a quaternized ammonium polymer.

44. The cell of claim 43 wherein said ionomeric material comprises a tetraalkylammonium polymer.

45. The cell of claim 33 wherein said step (3) is carried out at an elevated temperature.

46. The cell of claim 45 wherein said step (3) is carried out at at least about 80° C.

47. The cell of claim 33 wherein a current density of at least about 40 mA/cm$^2$ is applied during said step (3).

48. The cell of claim 47 wherein said current density is at least about 100 mA/cm$^2$.

49. The cell of claim 48 wherein said step (c) is carried out at at least about 80° C.

50. The cell of claim 48 wherein said current is applied for about 1 minute to 2 hours.

* * * * *

UNITED STATES PATENT AND TRADEMARK OFFICE
CERTIFICATE OF CORRECTION

PATENT NO. : 4,787,964

DATED : November 29, 1988

INVENTOR(S) : M. Sohrab Hossain, et al

It is certified that error appears in the above-identified patent and that said Letters Patent is hereby corrected as shown below:

Due to PTO error an issue fee for another application was mistakenly applied to this application causing the application to be published on November 29, 1988.

Accordingly, no patent issued. This document is a publication as of November 29, 1988.

Signed and Sealed this

Sixteenth Day of May, 1989

Attest:

DONALD J. QUIGG

Attesting Officer

Commissioner of Patents and Trademarks